United States Patent
Libeskind

(10) Patent No.: US 7,277,428 B2
(45) Date of Patent: Oct. 2, 2007

(54) MULTIPLE STAGE CROSS CONNECT SWITCH

(75) Inventor: Michael B. Libeskind, Yardley, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1137 days.

(21) Appl. No.: 10/374,612

(22) Filed: Feb. 26, 2003

(65) Prior Publication Data
US 2004/0165584 A1 Aug. 26, 2004

(51) Int. Cl.
*H04L 12/50* (2006.01)
(52) U.S. Cl. .................. 370/388; 370/412; 340/2.21; 340/2.28
(58) Field of Classification Search .............. None
See application file for complete search history.

(56) References Cited

U.S. PATENT DOCUMENTS

| | | | | |
|---|---|---|---|---|
| 5,091,903 A | * | 2/1992 | Schrodi | 370/388 |
| 7,023,842 B2 | * | 4/2006 | Carson et al. | 370/388 |
| 7,046,661 B2 | * | 5/2006 | Oki et al. | 370/388 |

* cited by examiner

*Primary Examiner*—Duc Ho

(57) ABSTRACT

A cross connect switch has a plurality of stages. Each stage has a plurality of packers, a plurality of memory portions and a plurality of multiplexers. Each packer receives input data and provides the input data as a set of contiguous valid data. The multiplexers divide the valid data from one of the packers into a plurality of data subsets and route each data subset to a respective memory portion of that stage. Each stage except the final stage provides the data in the memory portions of that stage as a respective set of inputs to a next one of the stages. The final stage includes a plurality of multiplexers for selecting a respective subset of the data from each of the memory portions of the final stage and provides the selected data at a plurality of respective selected output ports.

23 Claims, 5 Drawing Sheets

MULTIPLE STAGE CROSS CONNECT SWITCH

FIELD OF THE INVENTION

The present invention relates to switches generally, and in particular to cross-connect switches.

BACKGROUND

A variety of cross connect switch designs have been used to receive N input signals and output N signals corresponding to any combination of the input signals, whether unicast or multicast to various ones of the output terminals.

One prior art design for a cross connect switch using application specific integrated circuit (ASIC) is referred to herein as the "Output Architecture." In this configuration, the decision regarding which data to output from each of the N output terminals is made at the output of the switch. A separate memory block is provided for each of the N outputs. Each of the N memory blocks has a size F*N, where F is the frame size. Each of the N memory blocks receives a complete copy of all of the N frames received at the N inputs. Each output is controlled to select one of the N frames of F bytes from the data in its respective memory block, and the remaining F*(N−1) bytes in that memory block are discarded. Thus, the memory block for each output wastes F*(N−1) bytes. In total, the switch requires N*(F*N) bytes of memory, from which N*F*(N−1) bytes are wasted. This may be acceptable when N is small, but the total memory requirements become excessive as N becomes large.

An alternative switch design (referred to herein as the "Input Architecture") moves the decision point to the input stage of the switching ASIC. In the Input Architecture, only F bytes of memory are required at each output. N multiplexers are provided at the input bus, each of which receives the N input frames. Each of the N multiplexers selects the frame to be output by its respective output terminal. No memory is wasted by this design. However, N multiplexers are required, and each must receive all of the inputs. This may be acceptable for small values of N, but the total amount of logic required and the size of the bus to distribute the N*F bytes to each of the N multiplexers become excessive as N becomes large.

An improved cross connect switch is desired.

SUMMARY OF THE INVENTION

A cross connect switch comprises a plurality of stages. Each stage has a plurality of packers, a plurality of memory portions and a plurality of multiplexers. Each packer receives at least one set of input data and provides the input data as a set of contiguous valid data. The plurality of multiplexers divide the valid data from one of the packers into a plurality of data subsets and provides each data subset to a respective memory portion of that stage. Each one of the stages, except a final one of the stages, provides the data in the memory portions of that one stage as a respective set of inputs to a next one of the stages. The final stage includes a plurality of multiplexers for selecting a respective subset of the data from each of the memory portions thereof and provides the selected data at a plurality of respective selected output ports.

DETAILED DESCRIPTION

Figure 1:
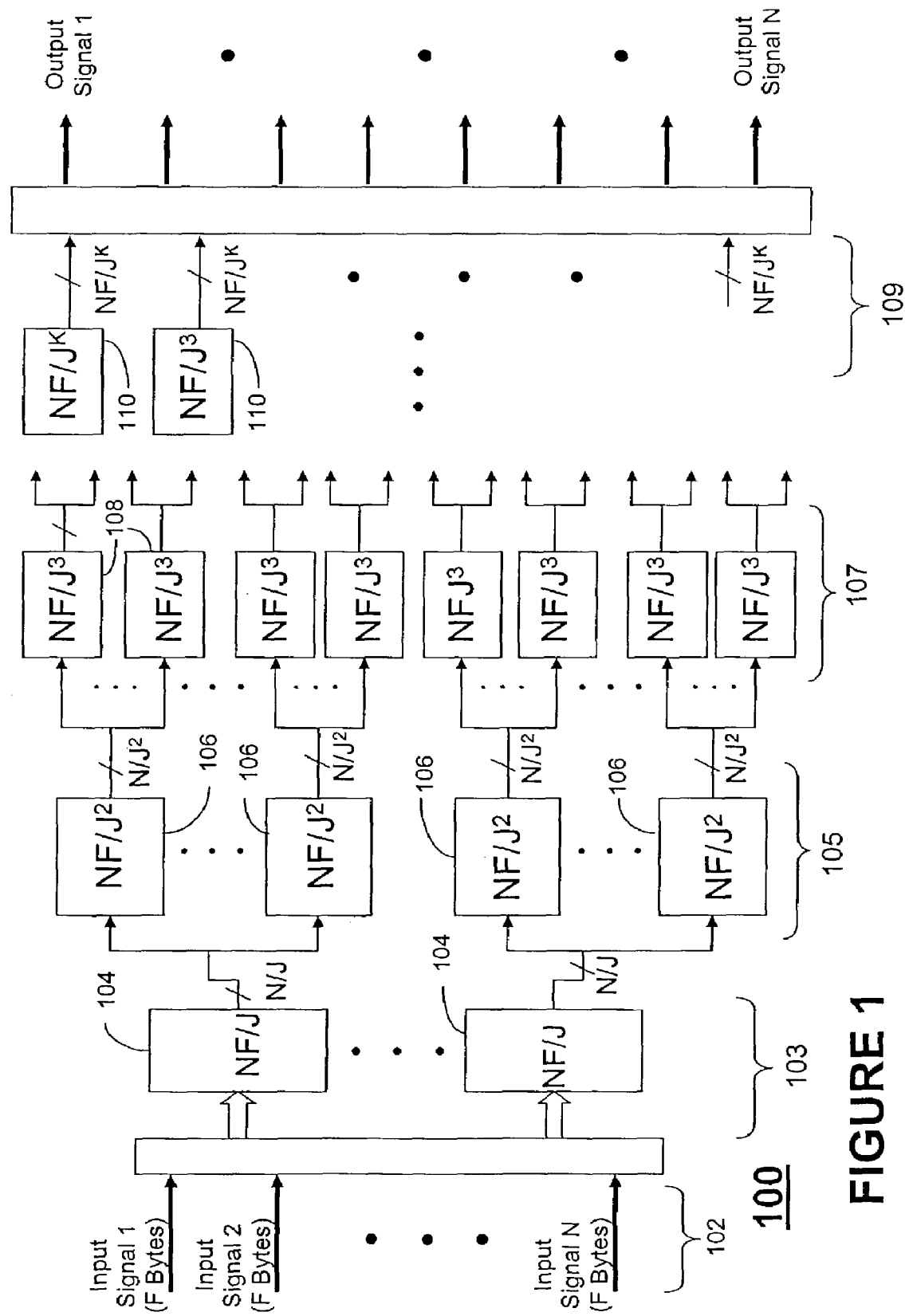
FIG. 1 is a block diagram of an exemplary embodiment of the present invention.

In the description, relative terms such as "lower," "upper," "horizontal," "vertical,", "above," "below," "up," "down," "top" and "bottom," "north," "south," "east," "west," as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

Examples of switches are described herein which require less memory than an N×N switch using the "Output Architecture," while at the same time requiring fewer multiplexing structures than the "Input Architecture."

FIG. 1 is a simplified block diagram of a cross connect switch 100 according to one exemplary embodiment. The exemplary switch 100 receives N*F input bytes for N frames of data, where N is the number of input terminals, and F is the frame size. The exemplary switch also outputs N*F bytes. The cross connect switch 100 comprises a plurality of stages 103, 105, 107, 109. Each stage divides the valid input data it receives into a plurality of data subsets and routes each data subset to a respective memory portion 104, 106, 108, 110 of that stage. By the final stage (stage K) 109, the original "valid" input data (defined herein as data that are to be routed to at least one of the outputs) are divided into several memory portions 110, each memory portion 110 containing a number of data considerably smaller than the number of data input to the switch 100. Each memory portion 110 in the final stage 109 provides one of its plurality of data as an output of the switch 100. Because each of the memory portions has a number of data that is a small fraction of the number (N*F) of input data, the number of "wasted bytes" associated with each output is much smaller than the conventional "output architecture" described above.

In the example of FIG. 1, at each stage, each received input stream is divided into J equal portions, where J is an integer greater than one. In a given stage i, there are $J^i$ memory portions, each storing $N*F/J^i$ bytes of data. Thus, the final stage K has $J^K$ memory portions, each storing $N*F/J^K$ bytes of data. Each output of switch 100 uses one frame's worth (F) of the bytes from a respective memory portion of stage K, and only $F*(N/J^K-1)$ bytes are wasted for each output, for a total of $F*(N)(N/J^K-1)$ wasted bytes for the switch. If K is greater than 2, this is much less wasted memory than the "output architecture," which wastes F*N*(N−1) bytes.

In the embodiment of FIG. 1, for simplicity, at each stage, each subset of data provided as an input to that stage is shown as being divided into a constant number (J) of portions. In other embodiments, the number J can vary from stage to stage. (That is, J can be an array having a respective value for each stage.) For example, in the first stage 103, the input data may be divided into four subsets (not shown), with each subset further divided into two smaller portions in the second stage 105. In a preferred embodiment, the number J in the final stage K is selected so that each output of the switch 100 has a respectively different memory portion. In general the dividing technique described below can be applied using any value of J in any stage, and the value of J in each stage is independent of the value of J in every other stage.

In still other embodiments, it is not necessary for every memory portion in a given stage to have the same size. For example, in one embodiment, the second stage 105 may have two memory portions 106 of size N*F/4 and four memory portions (not shown) of size N*F/8. Specific embodiments may be configured to suit the desired flexibility for any given end application of the switch.

Although the embodiment of FIG. 1 is an N×N switch having the same number of outputs as inputs, the number of inputs and number of outputs are not necessarily equal. In some embodiments, the switch may be configured to drop selected ones of the input data, if the number of outputs is fewer than the number of inputs. In other embodiments, wherein the number of outputs is greater than the number of inputs, the switch may multicast one or more of the input data. (One of ordinary skill recognizes that an N×N switch may also be configured so that some input data are multicast, while other input data are dropped.)

Details of an exemplary method and structure for dividing the data at each stage are now described with reference to FIGS. 2-5. In the example of FIGS. 2-5, a constant value of J=2 is used in each stage, for ease of depiction. This configuration is also referred to below as a "binary architecture," because at each stage, each input data subset is divided into two stage-output data subsets. The principles described below apply equally to other values of J. In FIGS. 2-5, three levels are shown for ease of depiction. Any number of stages may be used. As the number (N) of inputs grows, increasing the number of stages becomes more desirable to reduce memory requirements. The example of FIGS. 2-5 is an N×N switch having 48 inputs and 48 outputs, with a frame size F of 384 bytes. Any other frame size may be used, with appropriate sizing of the memories to accommodate the frames.

Figure 2:
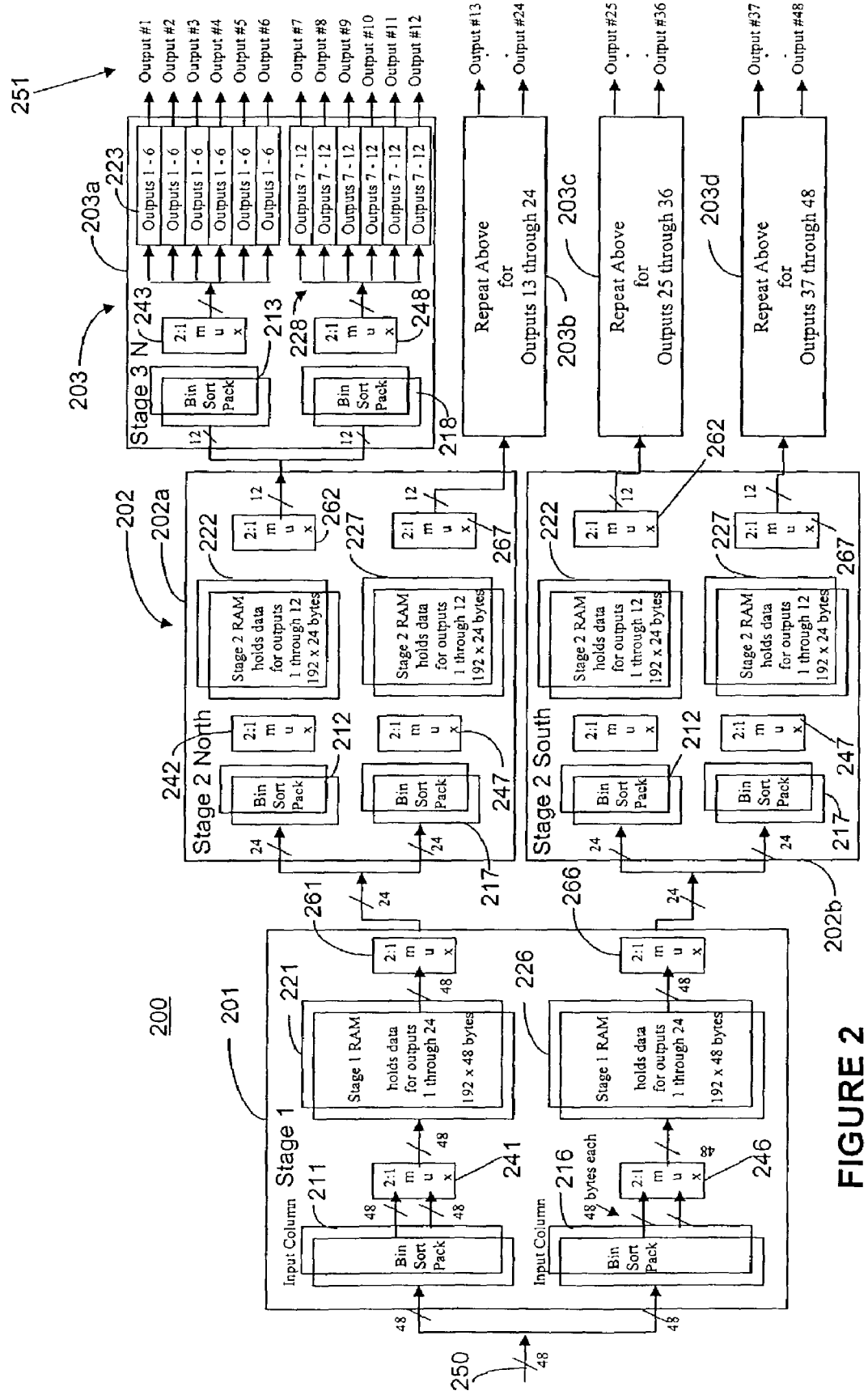
FIG. 2 is a block diagram of one embodiment.

FIG. 2 is a diagram of an exemplary switch 200. Switch 200 has three stages, 201, 202, 203. Each stage 201, 202, 203 has a plurality of packers 211 and 216, 212 and 217, 213 and 218, respectively and a plurality of random access memories (RAMs) 221 and 226, 222 and 227, 223 and 228. Each packer 211, 216, 212, 217, 213 and 218 receives at least one set of input data.

Each packer 211, 216, 212, 217, 213 and 218 provides the "valid" input data it receives (which are intended to be output from the switch 200) to a respective one of a plurality of memory portions 221, 226, 222, 227, 223, 228 as a set of "packed," contiguous data. The "valid" data are the data in the specific byte positions within each respective frame that are identified a priori to be passed by the packer to the payload RAM fed by that packer. For example, packer 211 provides data designated as "valid" to the northeast RAM 221a and northwest RAM 221b. A method and structure for designating which data are "valid" is described further below with reference to FIGS. 3-5.

Referring again to FIG. 2, each stage 201-203 has a plurality of multiplexers 241, 246, 242, 247, 243 and 248 respectively, for dividing the valid data from a respective one of the packers 211, 216, 212, 217, 213 and 218 into a plurality of data subsets and routing each data subset to a respective memory portion 221, 226, 222, 227, 223, 228 of that stage.

Each one of the stages 201, 202 (except the final stage 203) provides the data in the respective memory portions 221, 222 of that one stage as a respective set of inputs to a next one of the stages. Each successive stage packs the data into an increasing number of successively smaller memory portions.

The final stage 203 includes a plurality of multiplexers (shown in FIG. 5) for selecting a respective subset of the data from each of the memory portions 223 thereof and providing the selected data at a plurality of respective selected output ports.

Figure 3:
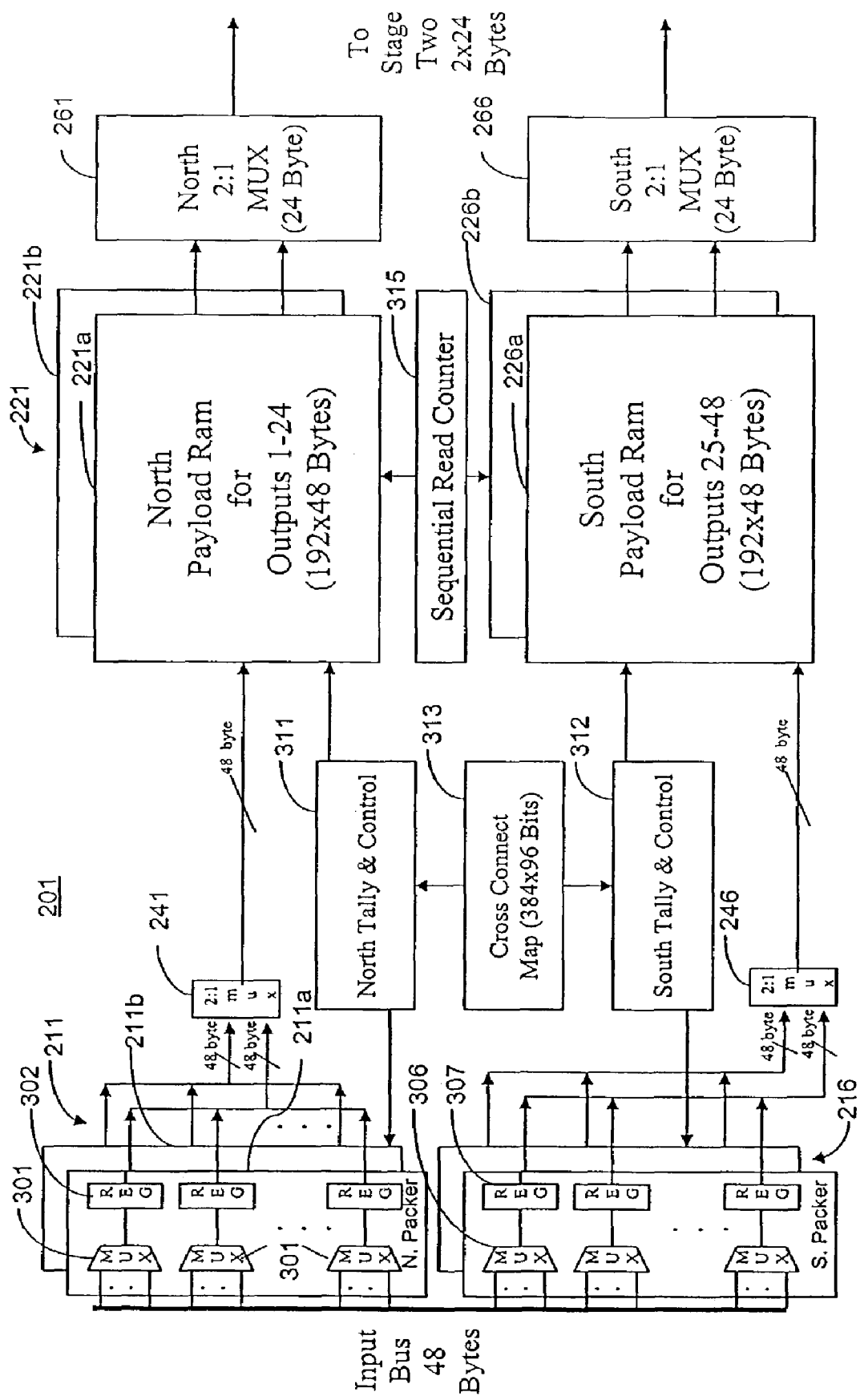
FIG. 3 is a block diagram of the first stage shown in FIG. 2.

FIG. 3 is a more detailed block diagram showing the first stage 201 of the switch 200. The input bus provides the 48 byte wide multiplex of 384 byte frames to each of the "North" and "South" packers 211, 216. The following discussion refers to the components labeled North Packer 211, North Payload RAM 221a, 221b, and North Tally and Control 311, but the discussion also applies to the corresponding components labeled South Packer 216, South Payload RAM 226a, 226b, and South Tally and Control 312.

Within each packer 211, 216 a plurality of N (=48) input multiplexers 301 receive the input data from the N respective switch inputs 250. Each byte position within each frame has two assigned "valid" bit (stored in the cross connect map 313). One "valid" bit is set to control whether the byte of data in that position is to be stored in the North RAM 221a, 221b. The other valid bit is set to control whether the byte of data in that position is to be stored in the South RAM 226a, 226b. The multiplexer select input (not shown) of each multiplexer 301 is controlled using the valid bit corresponding to the byte position (within a frame) of the currently incoming byte, and 48 different possible storage locations in RAM (24 locations in North Ram 221, and 24 locations in South Ram 226.

The packers 211, 216 are shown in portions 211a/211b and 216a/216b. Each packer portion 211a and 211b can store 48 bytes in its registers 302 (i.e., one byte for each of the inputs during a clock cycle). One portion 211a can be written to (packing data) while the other portion 211b (containing packed data) is read from during the same clock cycle. In the next clock cycle, portion 211a is read from, while portion 211b is written to. Portions 211a and 216a have multiplexers 301, 306 and registers 302, 307, as shown. Portions 211b and 216b each include a second group of 48 registers that are connected to the multiplexers 301, 306 to implement a circular queue. The multiplexers are not duplicated in packer portions 211b and 216b. Each multiplexer 301 feeds two registers 302—a first register in portion 211a and a second register in portion 211b. Similarly, each multiplexer 306 feeds two registers 307—a first register in portion 216a and a second register in portion 216b. A chunk of 48 contiguous bytes to be written into the RAM 221 appears in one of the packer portions 211a or 211b, but a write operation to the registers 301 (306) may cross the boundary between packer portions 211a and 211b (or between portions 216a and 216b).

At any given time the packer 211 stores between 0 and 47 valid bytes. When it reaches 48 valid bytes, the packer needs to write a chunk of data into the RAM 221. The number of valid bytes in the packer 211 is stored by a register driving a "current mux offset" signal (not shown). The current mux offset signal is a modulo 48 counter provided by the tally and control block 311. Because the number of "valid" data from each frame to be stored in the RAM does not have to be an even multiple of 48, the mux offset signal or an equivalent counter is used to keep track of the register 302 into which the first valid byte of data is written for each successive group of 48 bytes input to the first stage 201. There are two registers associated with each multiplexor 301. For this purpose, assume that they are numbered as i and i+48, where i is the multiplexer number. Successive valid bytes (which may not be contiguously positioned in the incoming data stream 250) are stored in successive contiguous multiplexers 302 in a round robin fashion.

Initially there are no valid bytes in any of the 96 registers 302. At the first clock cycle the cross connect map 313 ("entrace" map) indicates that anywhere from 0 to 48 bytes are to be written into the registers 302. The first valid byte goes to the first register 302, the second valid byte to the second register, and so on. Therefore, the first multiplexer 301 selects the first valid byte, the second multiplexer 301 selects the next valid byte, and so on.

The 96 registers 302 (48 registers in packer portion 211a and 48 registers in packer portion 211b) implement a circular queue. The 48 bytes to be written to RAM 221 alternate between the two groups of 48 registers 302. The 2:1 multiplexer 241 selects one group at a time by flopping after every write to the 48$^{th}$ register. A write is controlled when the "current multiplexer offset" counter rolls over from 47 to 0.

The outputs from each packer 211, 216 are provided to a respective multiplexer 241, 246. Multiplexers 241, 246) route the data from each register 302 into the "North" RAMs 221 and/or routes data from each register 307 into the "South" RAMs 226. As noted above, there are two valid bits corresponding to each individual byte position and input terminal of the switch, and these two bits can be set independently of each other, so that either or both valid bits can be set to the "valid" state, or both can be set to the "invalid" state. For a given byte position with each frame, the first stage 201 allows that byte to be designated "valid" for storage in up to 24 different locations in the North RAM 221.

The 2:1 multiplexer 241 receives two 48 byte streams from the packer portions 211a and 211b and outputs a single 48 byte stream for transmitting up to half of the input bytes received by the North packer 211 to the payload RAM 221 (comprising RAM portions 221a and 221b) for outputs 1-24. As one of ordinary skill will understand, the 24 selections could be any 24 different bytes within each frame, 24 copies of a single byte, or any combination of unicast and multicast outputs. One RAM portion 221a can be written to, while the other portion 221b is read from (by multiplexer 261) during the same clock cycle. Alternatively, a multiport RAM may be used to allow read and write operations from different cells of the memory during the same clock cycle. The swap of which RAM portion 221a or 221b is being read and which is being written is typically done on the frame boundary for SONET data. The RAM 221 is sized to accommodate the maximum data payload, which would be received if half of the 384 bytes of each frame are marked as "valid" in the cross connect map 313.

The contents of the North RAM portions 221a and 221b are read out by 2:1 multiplexer 261 and passed in a 24 byte wide stream to stage 2.

Block 313 is the cross connect map, a 384×96 bit array. Preferably, cross connect map 313 is software programmable. A microprocessor or microcontroller is programmed to store a set of valid bits in map 313 that allows the desired set of outputs to reach the third stage, for output from the switch. For each of the 384 bytes of an input frame, the user defines which (anywhere from 0 to 48) of the 48 outputs transmit that byte from the switch. The program determines which data must be available in the RAMs 221, 226, 222, 227, 223, 228 to support this set of outputs, beginning at the final stage, and working backward to the first stage. The control maps 311, 312, 411, 412, and 512 512 are then written to place the needed data in the respective RAMs, beginning with the maps of the first stage, and progressing all the way to the last stage.

Because some of the bytes in each 384 byte frame are not passed on to any of the outputs (i.e., are not "valid"), the map 313 provides an indication of which input bytes are to be packed into the RAM 221.

The North tally and control block 311 reads the contents of the cross connect map 313 and controls the operation of the packer 211. By reading the valid bits in the map 313, the tally and control block determines the total number of "valid" bytes received during each clock cycle, and the next one of the registers 302 into which the next valid byte is stored. Control block 311 provides the multiplexer control signals and register enable signals to multiplexers 301 and registers 302 in the appropriate sequence to output the packed stream to RAM 221.

The sequential read counter 315 provides the mapping between individual bytes of data (i.e., position within a frame) and the corresponding locations in the RAM 221 which each byte is stored. Thus, the read counter 315 provides a function analogous to that performed by the tally and control blocks 311 and 312 for the packers 211, 216.

The structure and function of the "South" packer 216, multiplexers 306, registers 307, tally and control block 312, RAM 226 and multiplexers 246 and 266 are the same as described above for the corresponding "North" components 211, 311, 221, 241 and 261, respectively, and descriptions of these items are not repeated.

Figure 4:
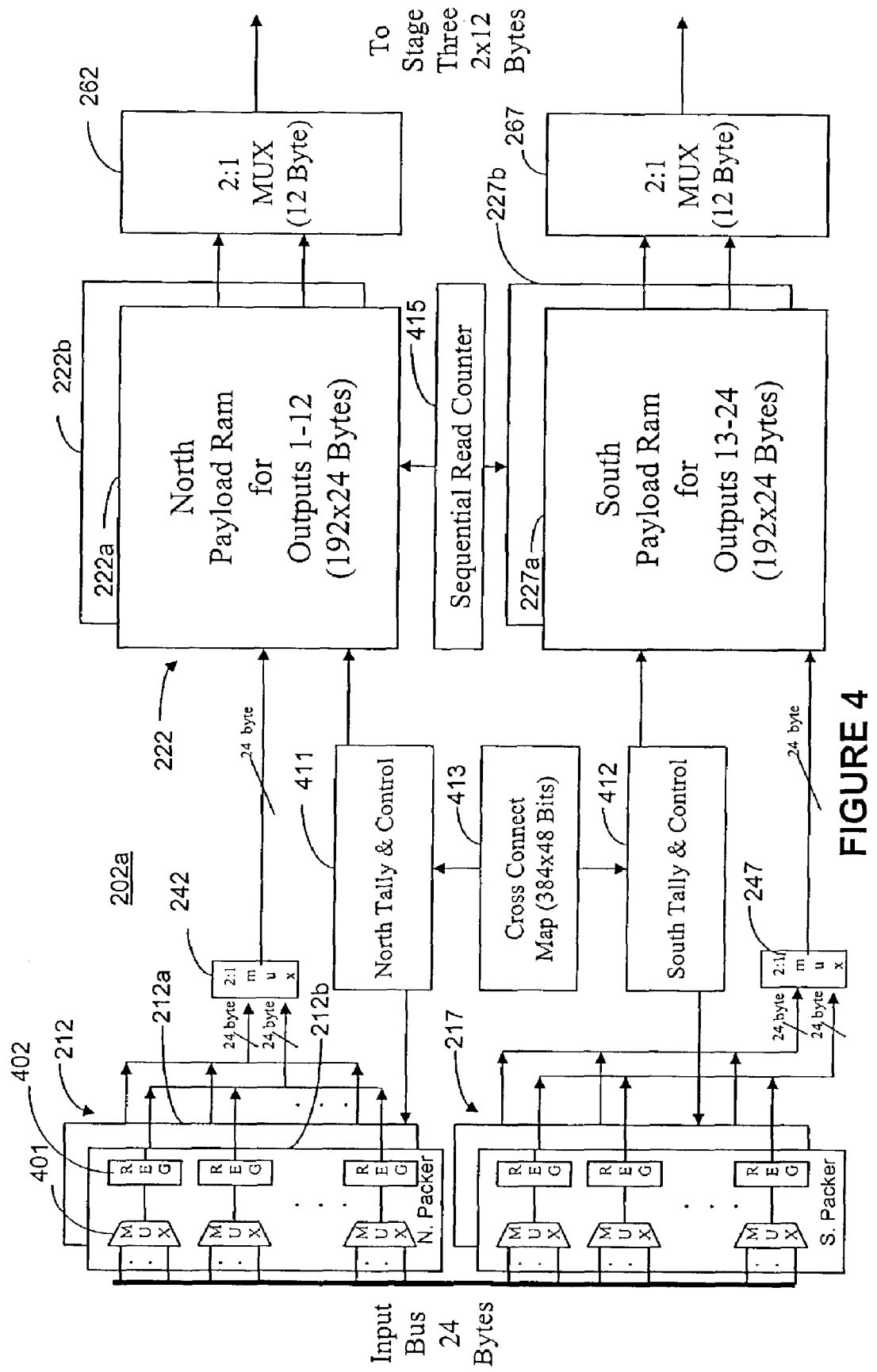
FIG. 4 is a block diagram of one half of the second stage shown in FIG. 2.

FIG. 4 is a block diagram of the "North" block 202a of the second stage 202 shown in FIG. 2. The structure and operation of the "South" block 202b are the same as that for block 202a, and are not described separately. The structure and operation of block 202a is similar to that of the first stage 201, as is now described, except that there are twice as many packers and RAMs, each of which is half the size of the corresponding structure in the first stage.

The input bus coming from the first stage provides the 24-byte-wide multiplex of data to each of the "North" and "South" packers 212, 217.

The packers 212 are shown in portions, 212a and 212b. One portion 212a can be written to while the other portion 212b is read from during the same clock cycle. Portions 212a and 217a have multiplexers 401, 406 and registers 402, 407, as shown. Portions 212b and 217b each include a second group of 24 registers that are connected to the multiplexers 401, 406 to implement a circular queue. The multiplexers 401, 406 are not duplicated in packer portions 212b and 217b. Each multiplexer 401 feeds two registers 402—a first register in portion 212a and a second register in portion 212b. Similarly, each multiplexer 406 feeds two registers 407—a first register in portion 226a and a second register in portion 226b. A chunk of 24 contiguous bytes to be written into the RAM 222 appears in one of the packer portions 212a or 212b, but a write operation to the registers 401 (406) may cross the boundary between packer portions 212a and 212b (or between portions 217a and 217b).

Within each packer 212, 217 a plurality of N (=24) input multiplexers 401, 406 receive the data from the multiplexer 261, 266 of the first stage. Up to half of the data received from the first stage can be stored in the "Northwest" RAM 222, and up to half of the data received from the first stage can be stored in the "Northeast" RAM 227. The selections of which data are stored in each RAM 222 and 227 are independent of each other. Some data may be stored in both RAMs 222 and 227, some stored in either 222 or 227, and some stored in neither 222 or 227. Thus, the second stage uses a cross connect map 413 similar to the map 313 used in the first stage 201. The multiplexer select input (not shown) of each multiplexer 401, 406 is controlled using the valid bit corresponding to each respective byte position in the map 413. Block 413 is the cross connect map, a 384×48 bit array. Preferably, cross connect map 413 is software programmable in the same manner as the cross connect map 313.

When data come into the multiplexers 401, the tally and control circuit 411 controls the appropriate multiplexer 401 (406) to output data to its corresponding register 402 (407), to form a packed sequence of valid data.

The outputs from each packer 212, 217 are provided to a respective multiplexer 242, 247. Multiplexers 242, 247 route the data from each register into the "North" and/or "South" RAMs 222, 227.

The 2:1 multiplexer 242 (247) receives two 24 byte streams from the packer portions 212a and 212b (217a and 217b) and outputs a single 24 byte stream for transmitting half of the data received from the first stage to the payload RAM 222 (227) for outputs 1-12. As one of ordinary skill will understand, the 12 selections could be any 12 different ones of the 24 bytes from the first stage, 12 copies of a single byte, or any combination of unicast and multicast data. One RAM portion 222a can be written to, while the other RAM portion 222b is read from during the same clock cycle. Similarly, one RAM portion 227a can be written to while the other RAM portion 227b is read from during the same clock cycle. Alternatively, multiport RAMs may be used to allow read and write operations from different cells of each memory during the same clock cycle. The RAMs 222, 227 are sized to accommodate the maximum data payload, which would be received if half of the bytes received from the first stage are written to each of the second stage RAMs.

The contents of the North RAM portions 222a and 222b are read out by 2:1 multiplexer 262 and passed to stage 3, described below with reference to FIG. 5. Similarly, the contents of the South RAM portions 227a and 227b are read out by 2:1 multiplexer 267 and passed to stage 3.

The North tally and control block 411 reads the contents of the cross connect map 413 and controls the operation of the packer 212. Control block 411 provides the multiplexer control signals and register enable signals to multiplexers 401 and registers 402 in the appropriate sequence to output the packed stream. The operation of this block is similar to that of the tally and control blocks 311 and 312, except that the tally and control blocks 411 and 412 use a modulo 24 counter instead of a modulo 48 counter.

The 48 registers 402 (24 registers in packer portion 212a and 24 registers in packer portion 212b) implement a circular queue. The 24 bytes to be written to RAM 222 alternate between the two groups of 24 registers 402. The 2:1 multiplexer 242 selects one group at a time by flopping after every write to the 24$^{th}$ register. A write is controlled when the "current multiplexer offset" counter rolls over from 23 to 0.

The structure and function of the "South" packer 217, tally and control block 412, RAM 227 and multiplexers 247 and 267 are the same as described above for the corresponding "North" components 212, 312, 222, 242 and 262, respectively, and descriptions of these items are not repeated.

Figure 5:
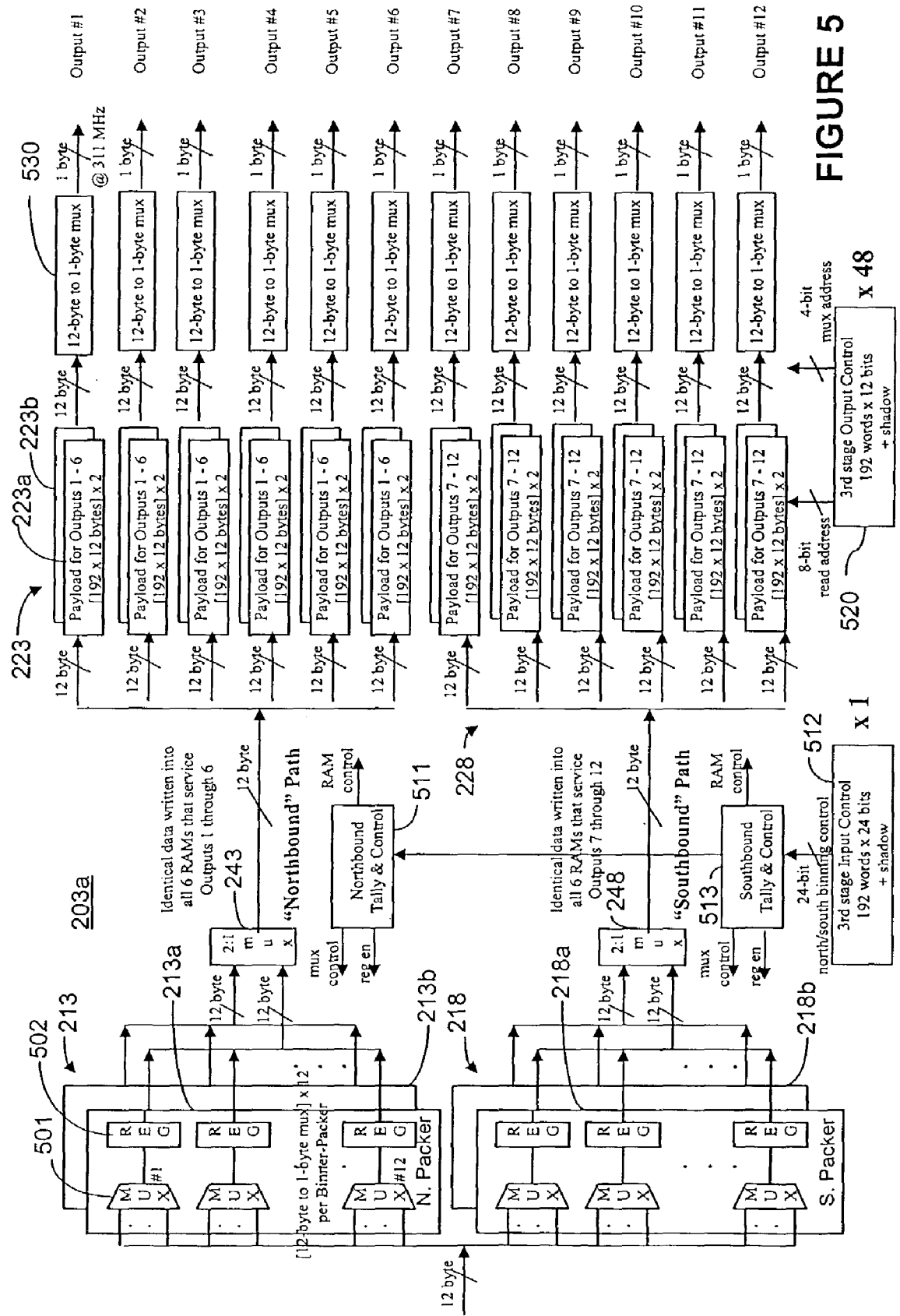
FIG. 5 is a block diagram of one fourth of the third stage shown in FIG. 2.

FIG. 5 is a block diagram of block 203a of the third stage 203 shown in FIG. 2. The structure and operation of the other three blocks 203b, 203c and 203d are the same as that for block 203a, and are not described separately. The structure and operation of block 203a is now described.

The input bus coming from the second stage provides the 12 byte wide multiplex of data to each of the "North" and "South" packers 213, 218.

The packers 213, 218 are shown in portions, 213a/213b and 218a/218b. One portion 213a (or 218a) can be written to while the other portion 213b (or 218b) is read from during the same clock cycle. Portions 213a and 218a have multiplexers 501 and registers 502, as shown. Portions 213b and 218b each include a second group of 24 registers that are connected to the multiplexers 501 to implement a circular queue. The multiplexers 501 are not duplicated in packer portions 213b and 218b. Each multiplexer 501 feeds two registers 502—a first register in portion 213a and a second register in portion 213b. The South packer portions 218a and 218b are configured the same way A chunk of 24 contiguous bytes to be written into the RAM 223 appears in one of the packer portions 213a or 213b, but a write operation to the registers 501 may cross the boundary between packer portions 213a and 213b.

Within each packer 213, 218a plurality of N (~12) input multiplexers 501 receive the data from the multiplexer 262 of the second stage. Each of the bytes received from the second stage is associated with a corresponding bit in the input control block 512. The multiplexer select input (not shown) of each multiplexer 501 is controlled using the valid bit corresponding to the byte position of the incoming data. When data come into the multiplexers 501, the tally and control 511 determines the next multiplexer 501 to output the data to its corresponding register 502 to form a packed sequence of data.

The outputs from each packer 213, 218 are provided to a respective multiplexer 243, 248. Multiplexers 243, 248 route the data from each register into six identical output RAMs 223 or 228, respectively. Thus, the third stage sections 203a, 203b, 203c and 203d provide a total of eight sets of outputs, each set providing six outputs.

The 2:1 multiplexer 243 receives two 12 byte streams from the packer portions 213a and 213b and outputs a single 12 byte stream for transmitting six selected ones of the 12 bytes received from the second stage in a cycle to the payload RAMs 223 for outputs 1-6. As one of ordinary skill will understand, the six selections could be any six different ones of the 12 bytes from the second stage, six copies of a single byte, or any combination of unicast and multicast outputs. One RAM portion 223a can be written to while the other RAM portion 223b is read from during the same clock cycle. Alternatively, a multiport RAM may be used to allow read and write operations from different cells of the memory during the same clock cycle. The RAM 223 is sized to accommodate the maximum data payload, which would be received if half of the data received from the corresponding RAM of the second stage are stored in RAM 223.

A respective multiplexer 530, 535 is provided at the output of each third stage RAM 223, 228. Each multiplexer 530, 535 is controlled to select any one of the six bytes stored in it respective RAM 223, 228 as an output of the switch 200.

Block 513 is a 192×24 bit array similar to the cross connect maps described above. Preferably, cross connect map 513 is software programmable. The map 513 provides an indication of which input bytes are to be packed into the RAMs 223 and 228, as well as into which rows of the RAM the data are stored.

The third stage output control block 520 controls the operation of the packer 213. Control block 520 provides the multiplexer control signals and memory read enable signals to multiplexers 530, 535 and RAMs 223, 228 in the appropriate sequence to output the desired data from each output of switch 530. Each of the eight sets of outputs from the third stage can provide any of 12 different output signals.

The structure and function of the "South" packer 218, tally and control block 512, RAM 228 and multiplexers 248 and 535 are the same as described above for the corresponding "North" components 213, 512, 223, 243 and 530, respectively, and descriptions of these items are not repeated.

Based on the above example, one of ordinary skill will understand that the exemplary switch 200 achieves a reduction in the number of RAMs required. For the binary switch configuration (two divisions per stage) the total number of memory portions is is given by:

Total number of memory portions $$= j + \sum_{i=1}^{n-1} 2^i,$$

where n is the number of stages, j is the number of output ports, and i is an integer. This takes into account that a separate RAM 223 is provided corresponding to each output of the switch.

In one embodiment, the switch described above is incorporated in a synchronous optical network (SONET) switching application specific integrated circuit (ASIC). However, one of ordinary skill in the art can readily incorporate the structure and methods described above into other switching applications.

Table 1 provides an example comparing the RAM requirements for three different 48×48 cross connect switches, using the Input Architecture, the Output Architecture, and the Binary example of FIGS. 2-5. The embodiment of FIGS. 2-5 uses significantly less total RAM (308 Kbytes) than the Output Architecture (1803 Kbytes), and significantly fewer RAM devices (181) than the Input Architecture (4608). The added logic for the Binary design is modest relative to the amount of logic used in the Output Architecture (and significantly less than is required for the Input Architecture

TABLE 1

| Architecture | Input Architecture (Prior Art) | Output Architecture (Prior Art) | Binary |
|---|---|---|---|
| #I/O | 48 | 48 | 48 |
| Payload RAM | 36 Kbytes | 1769 Kbytes | 281 Kbytes |
| Control RAM | 35 Kbytes | 34 Kbytes | 34 Kbytes |
| Total RAM | 71 Kbytes | 1803 Kbytes | 308 Kbytes |
| #RAMs | 4608 | 432 | 181 |
| Bus Description | 48-byte-wide bus for 2304 drops × 1 bus | 48-byte-wide bus for 48 drops × 1 bus | 48-byte-wide bus for 96 drops × 1 bus + 24-byte-wide bus for 48 drops × 2 bus + 12-byte-wide bus for 24 drops × 4 bus + 12-byte-wide bus for 6 drops × 8 bus |

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

I claim:

1. A cross connect switch, comprising:
   a plurality of stages, each comprising:
      a plurality of packers, each receiving at least one set of input data bytes and providing the input data bytes as a set of contiguous valid data,
      a plurality of memory portions, and
      a plurality of multiplexers for dividing the set of contiguous valid data from one of the packers into a plurality of data subsets and providing each data subset to a respective memory portion of that stage;
   each one of the stages except a final one of the stages providing the data subsets in the memory portions of that one stage as a respective set of inputs to a next one of the stages;
   the final stage including a plurality of multiplexers for selecting a respective subset of the data from each of the memory portions thereof and providing the selected subset of the data at a plurality of respective selected output ports.

2. The method of claim 1, wherein each memory portion in a given one of the stages has a common size, sufficient to accommodate a maximum number of payload data that can be provided to that memory portion by a corresponding one of the packers.

3. The switch of claim 1, wherein a total number of said plurality of output ports is equal to a total number of input ports receiving input data in a first one of the stages.

4. A switch in accordance with claim 1, wherein a total number of memory portions is in accordance with:

total number of memory portions $$= j + \sum_{i=1}^{n-1} 2^i,$$

where n is the number of stages, j is the number of output ports, and i is an integer.

5. The switch of claim 1, wherein each stage has two memory portions.

6. The switch of claim 2, wherein the switch has at least three stages.

7. The switch of claim 1, wherein each packer includes a plurality of multiplexers and a plurality of registers.

8. The switch of claim 7, wherein each byte received at the packers is associated with a valid bit, and the valid bits are used to control the multiplexers of the packers in the first stage.

9. The switch of claim 8, wherein the multiplexers of the packers in the first stage only pass a given byte if the respective valid bit associated with that byte has a value indicating that the given byte is valid.

10. A method for switching data, comprising the steps of:
   (a) receiving at least one set of valid data as input to one of a plurality of stages;
   (b) dividing the valid input data into a plurality of data subsets;
   (c) providing each data subset to a respective memory portion;

(d) providing the data subset in each memory portion as a respective set of input data to a next stage, if that memory portion is not included in a last one of the plurality of stages,
wherein steps (a), (b), (c) and (d) are performed for each respective one of the plurality of stages;
(e) selecting a respective subset of the data from memory portions of the last stage of the plurality of stages; and
(f) providing the selected respective subset of the data at a plurality of respective selected output ports.

11. The method of claim 10, wherein the dividing step includes dividing each set of valid input data for a given stage into a predetermined number of data subsets.

12. The method of claim 11, wherein the predetermined number is two.

13. The method of claim 12, wherein the number of stages equals three.

14. The method of claim 10, wherein the dividing step includes dividing each set of valid input data for a given one of the plurality of stages into data subsets of the same size as each other.

15. The method of claim 14, wherein each memory portion for a given one of the stages has a common size.

16. The method of claim 15, wherein the common size is equal to a common size of each data subset for that given stage.

17. The method of claim 10, wherein a total number of said plurality of output ports is equal to a total number of said plurality of input data.

18. A method in accordance with claim 10, wherein a total number of memory portions is in accordance with:

total number of memory portions $$= j + \sum_{i=1}^{n-1} 2^i,$$

where n is the number of stages, j is the number of output ports, and i is an integer.

19. A method for switching data, comprising the steps of:
(a) performing the following steps (a1) to (a4) for each value of i from 1 to n, where i and n are integers, and n is a number of stages, n being greater than one:
(a1) receiving at least one set of stage i valid input data;
(a2) dividing the stage i valid input data into a plurality of stage i data subsets;
(a3) providing each stage i data subset to a respective stage i memory portion;
(a4) providing the data subset in each stage i memory portion as a respective set of stage i+1 input data, if i is less than n;
(b) selecting a respective subset of the data from each of the stage n memory portions; and
(c) providing the selected respective subset of the data at a plurality of respective selected output ports.

20. The method of claim 19, wherein step (a2) includes dividing each set of stage i valid input data into a predetermined number of stage i data subsets.

21. The method of claim 19, wherein step (a2) includes dividing each set of stage i valid input data into stage i data subsets of the same size as each other.

22. The method of claim 21, wherein each stage i memory portion for a given value of i has a common size.

23. A method in accordance with claim 19, wherein a total number of memory portions is in accordance with:

total number of memory portions $$= j + \sum_{i=1}^{n-1} 2^i,$$

where j is the number of output ports.

* * * * *